United States Patent
Chien (10) Patent No.: US 8,922,745 B2
(45) Date of Patent: Dec. 30, 2014

(54) DISPLAY PANEL

(71) Applicant: Au Optronics Corporation, Hsinchu (TW)

(72) Inventor: Wei-Yi Chien, Keelung (TW)

(73) Assignee: Au Optronics Corporation, Hsinchu (TW)

( * ) Notice: Subject to any disclaimer, the term of this patent is extended or adjusted under 35 U.S.C. 154(b) by 44 days.

(21) Appl. No.: 13/649,116

(22) Filed: Oct. 11, 2012

(65) Prior Publication Data

US 2013/0128205 A1 May 23, 2013

(30) Foreign Application Priority Data

Nov. 18, 2011 (TW) ............................. 100142250 A (51) Int. Cl.
*G02F 1/1339* (2006.01)
*G02F 1/1341* (2006.01)

(52) U.S. Cl.
CPC .................................. *G02F 1/1341* (2013.01)
USPC ....................................................... 349/153

(58) Field of Classification Search
CPC ..................................................... G02F 1/1339
USPC ....................................................... 349/153
See application file for complete search history.

(56) References Cited

U.S. PATENT DOCUMENTS

| 6,124,917 | A | * | 9/2000 | Fujioka et al. | ................. | 349/153 |
| 2007/0236643 | A1 | * | 10/2007 | Fu | ................... | 349/153 |
| 2008/0002134 | A1 | * | 1/2008 | Jeong | .............................. | 349/153 |
| 2008/0137022 | A1 | * | 6/2008 | Komeno et al. | ................ | 349/153 |

FOREIGN PATENT DOCUMENTS

| TW | 200428063 | 12/2004 |
| TW | 1247936 | 1/2006 |
| TW | 200825509 | 6/2008 |

* cited by examiner

*Primary Examiner* — Dennis Y Kim (74) *Attorney, Agent, or Firm* — Jianq Chyun IP Office (57) ABSTRACT

A display panel including a display region and a sealant region is provided. The display panel includes a first and a second substrate opposite to each other, a dielectric layer, a planarization layer, a display medium and a sealant. The dielectric layer is disposed on the first substrate. The planarization layer is disposed on the dielectric layer, and has at least one opening exposing the dielectric layer. The opening is disposed at a corner of the sealant region, where a width of the opening is gradually reduced as away from the corner. The display medium and the sealant are respectively disposed in the display and the sealant region between the first and the second substrate. The sealant is filled in a part of the opening without covering at least a sidewall of the opening of the planarization layer, and contacts the dielectric layer through the opening.

19 Claims, 5 Drawing Sheets

DISPLAY PANEL

CROSS-REFERENCE TO RELATED APPLICATION

This application claims the priority benefit of Taiwan application serial no. 100142250, filed on Nov. 18, 2011. The entirety of the above-mentioned patent application is hereby incorporated by reference herein and made a part of this specification.

BACKGROUND OF THE INVENTION

1. Field of the Invention

The invention relates to a display panel, more particularly to a display panel with improved strength.

2. Description of Related Art

In display panels, a planarization layer is usually adopted to reduce the coupling effect generated between the metal circuits in different layers so as to increase the aperture ratio. Accordingly, the space between the metal circuits in different layers can be reduced, so that the metal circuits in different layers can be overlapped. Generally, the planarization layer covers the entire substrate except contact holes and bonding pads. Thus, a sealant used for adhering two substrates is substantially disposed on the planarization layer and contacts with the planarization layer. However, the adhesion between the planarization layer and a metal layer or an insulation layer is poor. When performing a strength test to the panel, the planarization layer usually peels off from the metal layer or the insulation layer easily, thereby affecting the strength of the panel.

In order to enhance panel strength, the planarization layer below the sealant can be removed for the sealant to contact the metal layer or the insulation layer directly, so as to provide stronger adhesion to prevent the peeling. Nevertheless, a peripheral circuit is usually disposed at a position corresponding to the sealant in panels with small dimension, and the removal of the planarization layer may cause damages such as oxidation and corrosion, thereby affecting the reliability of the panel. Therefore, researchers are now trying to minimize the negative effects causing by the removal of the planarization layer on the panel.

SUMMARY OF THE INVENTION

The invention is directed to a display panel having improved strength.

The invention is directed to a display panel including a display region and a sealant region. The display panel includes a first substrate, a dielectric layer, a planarization layer, a second substrate, a display medium, and a sealant. The dielectric layer is disposed on the first substrate. The planarization layer is disposed on the dielectric layer and has at least one opening exposing the dielectric layer. The opening is disposed at a corner of the sealant region and a width of the opening is gradually reduced as away from the corner of the sealant region. The second substrate is disposed opposite to the first substrate. The display medium is disposed in the display region between the first substrate and the second substrate. The sealant is disposed in the sealant region between the first substrate and the second substrate. The sealant is filled in a part of the opening without covering at least a sidewall of the opening of the planarization layer and contacts the dielectric layer through the opening.

The invention is further directed to a display panel including a display region and a sealant region. The display panel includes a first substrate, a dielectric layer, a first patterned conductive layer, a planarization layer, a second substrate, a display medium, and a sealant. The dielectric layer is disposed on the first substrate. The first patterned conductive layer is at least partially disposed on the dielectric layer in the sealant region. The planarization layer is disposed on the first patterned conductive layer and the dielectric layer, and has at least one opening disposed at a corner of the sealant region and exposing a part of the first patterned conductive layer and a part of the dielectric layer. The second substrate is disposed opposite to the first substrate. The display medium is disposed in the display region between the first substrate and the second substrate. The sealant is disposed in the sealant region between the first substrate and the second substrate. The sealant is filled in a part of the opening without covering at least a sidewall of the opening of the planarization layer and contacts the dielectric layer and the first patterned conductive layer through the opening.

In light of the foregoing, in the display panel of the invention, the planarization layer has the opening exposing the corner of the sealant region. The sealant is filled in a part of the opening without covering at least a sidewall of the opening of the planarization layer. Consequently, the sealant contacts the dielectric layer directly through the opening to replace a weaker adhesion between the planarization layer and the dielectric layer with a stronger adhesion between the sealant and the dielectric layer so as to improve the strength of the corner of the panel significantly. Accordingly, the display panel of the invention has improved strength.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the invention.

DESCRIPTION OF EMBODIMENTS

Figure 1A:
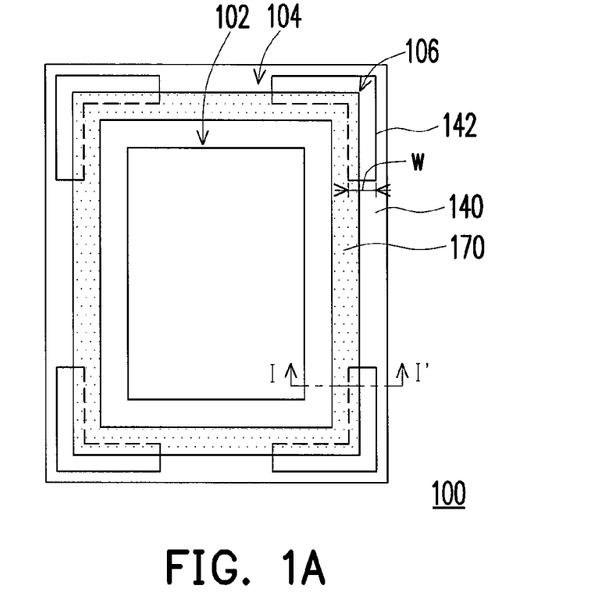
FIG. 1A is a schematic top view illustrating a display panel according to one embodiment of the invention.
Figure 1B:
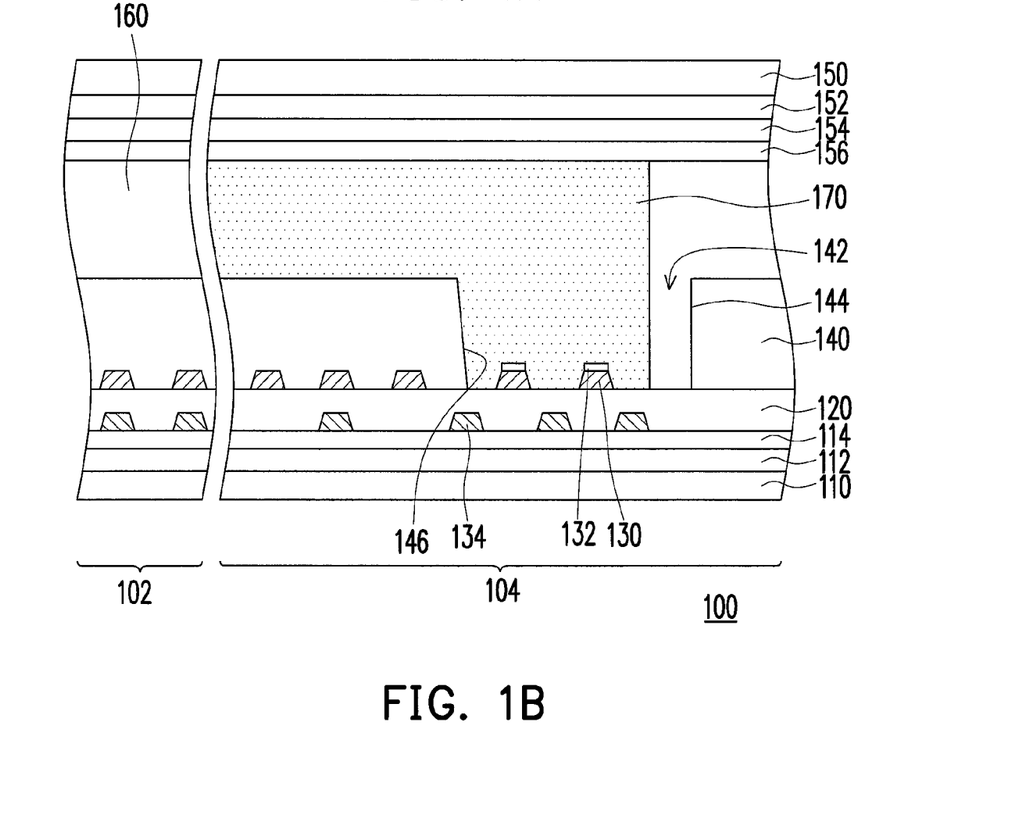
FIG. 1B is a schematic cross-sectional diagram taken along line I-I' in FIG. 1A.

FIG. 1A is a schematic top view illustrating a display panel according to one embodiment of the invention. FIG. 1B is a schematic cross-sectional diagram taken along line I-I' in FIG. 1A. For clarity of illustration, FIG. 1A merely shows a first substrate, a planarization layer, and a sealant. Referring to FIGS. 1A and 1B simultaneously, a display panel 100 includes a display region 102 and a sealant region 104. The sealant region 104 surrounds the display region 102, for example. The display panel 100 includes a first substrate 110, a dielectric layer 120, a first patterned conductive layer 130, a planarization layer 140, a second substrate 150, a display medium 160, and a sealant 170.

The dielectric layer 120 is disposed on the first substrate 110. The first patterned conductive layer 130 is at least partially disposed on the dielectric layer 120 in the sealant region 104. In the present embodiment, the first substrate 110 is, for instance, a glass substrate. The dielectric layer 120 is made of silicon oxide or silicon nitride, for example. The first patterned conductive layer 130 is made of metal, for instance. In the present embodiment, the first patterned conductive layer 130 in the sealant region 104 is, for example, a peripheral circuit.

In the present embodiment, the display panel 100 further includes a second patterned conductive layer 134, for instance. The dielectric layer 120 is, for example, disposed between the first patterned conductive layer 130 and the second patterned conductive layer 134. The second patterned conductive layer 134 is disposed between the dielectric layer 120 and the first substrate 110 or on the first substrate 110, for example. In other words, in the present embodiment, the dielectric layer 120 is an interlayer dielectric layer for insulating the first patterned conductive layer 130 and the second patterned conductive layer 134, for instance. The second patterned conductive layer 134 is made of metal, for instance. In the present embodiment, the display panel 100 further includes a buffer layer 112 and a dielectric layer 114, for instance. The dielectric layer 114 is, for example, disposed on the first substrate 110. The buffer layer 112 is disposed between the first substrate 110 and the dielectric layer 114, for example.

The second substrate 150 is disposed opposite to the first substrate 110. The display medium 160 is disposed in the display region 102 between the first substrate 110 and the second substrate 150. In the present embodiment, the second substrate 150 is, for instance, a glass substrate. The display medium 160 is, for example, a liquid crystal layer. In the present embodiment, a light shielding layer 152, a passivation layer 154, and an electrode layer 156 are disposed sequentially on the second substrate 150, for instance. Obviously, other layers can also be disposed on the second substrate 150 and the invention does not limit the disposition.

The planarization layer 140 is disposed on the first patterned conductive layer 130 and has at least one opening 142 disposed at a corner 106 of the sealant region 104 and exposing a part of the first patterned conductive layer 130. In the present embodiment, a material of the planarization layer 140 includes an organic material such as photo-sensitive resin like polyacrylate resin, poly(epoxyacrylic) resin, photosensitive polyimide resin, polyester acrylate resin, polyurethane acrylate resin, novolac epoxy acrylic resin or a mixture material thereof, for example. The opening 142 and the corner 106 of the sealant region 104 have a consistent shape, for example. For instance, in the present embodiment, the opening 142 has an L-shape which is consistent with a contour of the corner 106. Also, the opening 142 has a consistent width w, for instance, ranging from 300 μm to 1000 μm. In the present embodiment, the opening 142 exposes a part of the first patterned conductive layer 130, for example. The part of the first patterned conductive layer 130 exposed by the opening 142 has a patterned transparent conductive layer 132 disposed thereon, for instance. Herein, the patterned transparent conductive layer 132 is made of indium tin oxide (ITO), for instance. It should be noted that in the present embodiment, the display panel 100 is, for example, a low temperature polysilicon (LTPS) liquid crystal display (LCD) panel. Thus, the first patterned conductive layer 130 is usually not disposed with an insulation layer thereon. Conventionally, the patterned transparent conductive layer 132 is disposed on the first patterned conductive layer 130 to insulate moisture and oxygen. However, since fewer circuits are disposed at the corners of the display panel and most of them are common driving signals, the circuits have relatively small effect on the display panel even the circuits at the corners are corroded or oxidized. In other words, the patterned transparent conductive layer 132 may not be disposed on the first patterned conductive layer 130 exposed by the opening 142.

The sealant 170 is disposed in the sealant region 104 between the first substrate 110 and the second substrate 150. The sealant 170 is filled in a part of the opening 142 without covering at least a sidewall 144 of the opening 142 of the planarization layer 140, and contacts the dielectric layer 120 through the opening 142. In the present embodiment, the sealant 170 has a shape of a closed loop which surrounds the display region 102, for example. A material of the sealant 170 is a thermal curing adhesive, a photosensitive adhesive, or a photosensitive thermal curing adhesive, for example.

The opening 142 has two relative sidewalls 144 and 146, for example. Here, the sidewall 144 is farther away from the display region 102 than the sidewall 146. In other words, the sidewall 144 is an outer side and the sidewall 146 is an inner side, for example. In the present embodiment, the sealant 170, for instance, covers the planarization layer 140 on the inner sidewall 146 of the opening 142, but does not cover the planarization layer 140 on the outer sidewall 144 of the opening 142. In the present embodiment, the sealant 170 covers the part of the first patterned conductive layer 130 exposed by the opening 142, for example. The part of the first patterned conductive layer 130 exposed by the opening 142 is disposed with the patterned transparent conductive layer 132 thereon, for instance. In other embodiments, the disposition of the patterned transparent conductive layer 132 can be omitted on the part of the first patterned conductive layer 130 covered by the sealant 170.

Figure 2A:
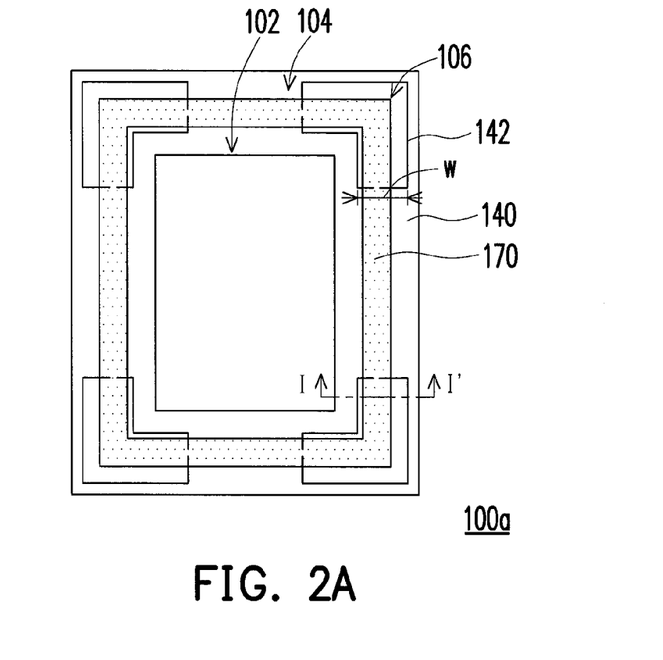
FIG. 2A is a schematic top view illustrating a display panel according to one embodiment of the invention.
Figure 2B:
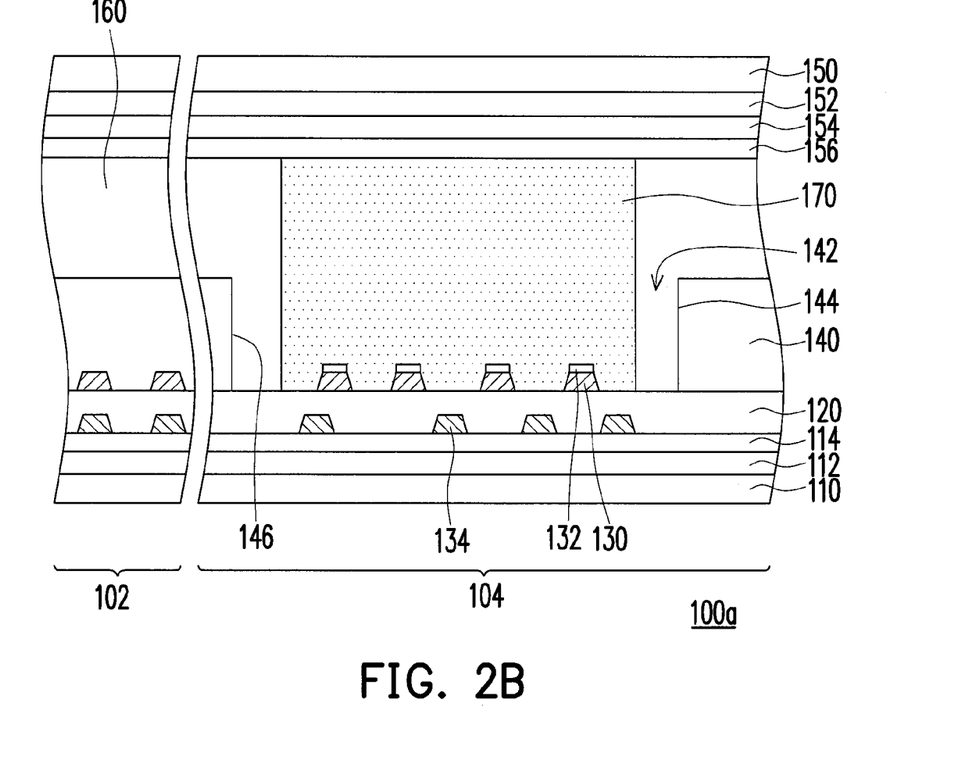
FIG. 2B is a schematic cross-sectional diagram taken along line I-I' in FIG. 1A.

In the present embodiment, the sealant 170 covers the inner sidewall 146 of the opening 142 and does not cover the outer sidewall 144 of the opening 142. Nonetheless, in another embodiment, as shown in FIGS. 2A and 2B, in a display panel 100a, the sealant 170 does not cover the two relative sidewalls 144, 146 of the opening 142. In other words, the sealant 170 merely fills in the opening 142, but does not contact or cover the inner sidewall 146 and the outer sidewall 144 of the opening 142. It should be noted that in the embodiment aforementioned, the planarization layer 140 has four openings 142 at the four corners 106 of the sealant region 104. In other embodiment, the planarization layer 140 can also have one, two, or three openings 142.

Generally, when a strength test is performed to the display panel, the planarization layer at the corners usually peels off from the metal layer or the insulation due to poor adhesion, thereby affecting the strength of the panel. However, the planarization layer 140 at the corner 106 of the sealant region 104 is removed to form the opening 142 in the present embodiment, so that the sealant 170 at the corner 106 of the sealant region 104 can contact the dielectric layer 120 directly through the opening 142. Since the adhesion between the sealant 170 and the dielectric layer 120 is remarkably greater than the adhesion between the planarization layer 140 and the dielectric layer 120, the strength at the corners of the display panels 100, 100a can be improved significantly. Particularly, only the planarization layer 140 at the corners is removed in the present embodiment. Since fewer circuits are disposed at the corners and most of the circuits are common signals, the short circuit and the corrosion of the circuits have smaller effects on the display panel. Therefore, the display panels 100, 100a in the present embodiment have improved strength and superior device properties.

Figure 3A:
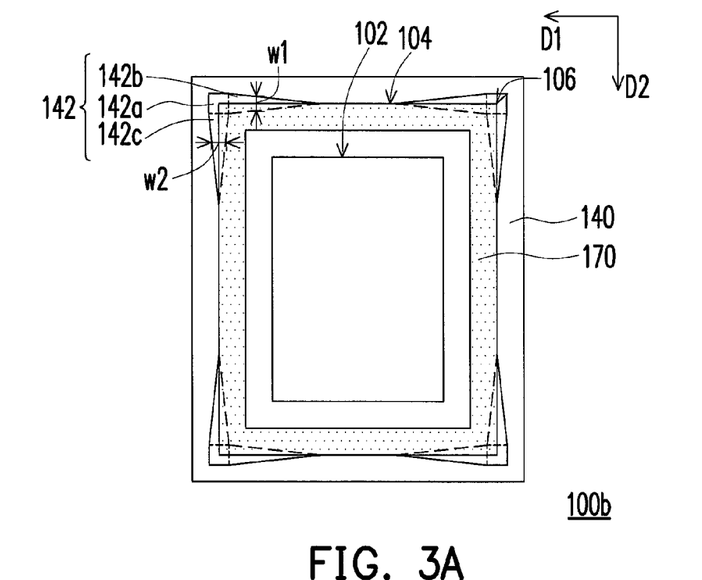
FIG. 3A is a schematic top view illustrating a display panel according to one embodiment of the invention.
Figure 3B:
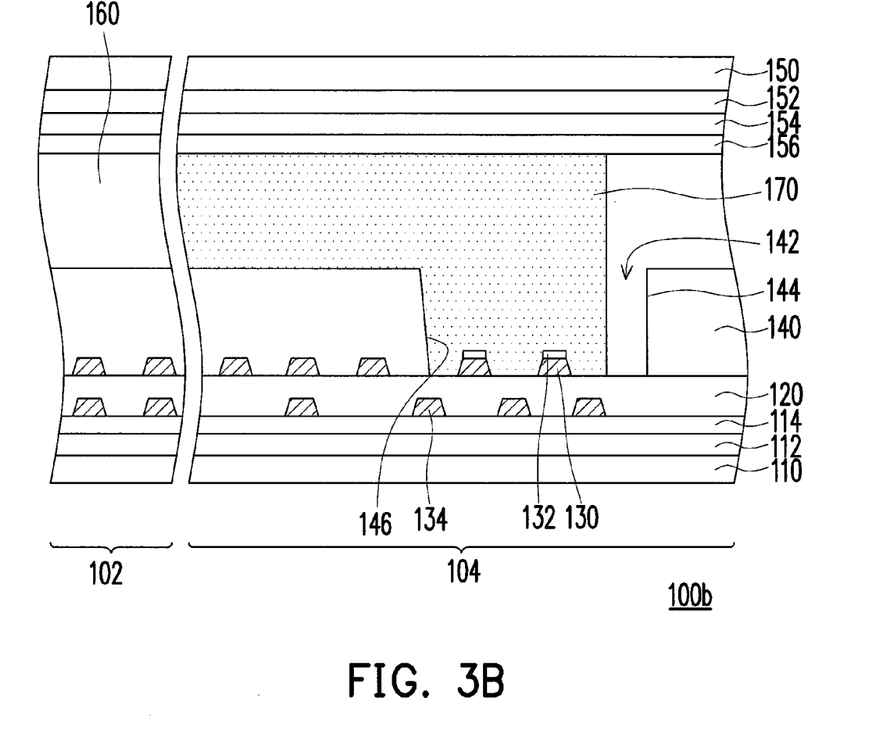
FIG. 3B is a schematic cross-sectional diagram taken along line I-I' in FIG. 3A.

FIG. 3A is a schematic top view illustrating a display panel according to one embodiment of the invention. FIG. 3B is a schematic cross-sectional diagram taken along line I-I' in FIG. 3A. Referring to FIGS. 3A and 3B simultaneously, a display panel 100b includes a display region 102 and a sealant region 104. The sealant region 104 surrounds the display region 102, for example. The display panel 100b includes a first substrate 110, a dielectric layer 120, a planarization layer 140, a second substrate 150, a display medium 160, and a sealant 170. In the present embodiment, the display panel 100b further includes, for example, a first patterned conductive layer 130, a second patterned conductive layer 134, a buffer layer 112, a dielectric layer 114, a light shielding layer 152, a passivation layer 154, and an electrode layer 156. In the present embodiment, the first patterned conductive layer 130, the second patterned conductive layer 134, the buffer layer 112, the second substrate 150, the dielectric layer 114, the light shielding layer 152, the passivation layer 154, the electrode layer 156 and the display medium 160 can be referred to the embodiments above-mentioned and the details are not reiterated hereinafter. The differences are illustrated in the following. Obviously, other layers can also be disposed on the first substrate 110 and the second substrate 150, and the invention does not limit the disposition.

The planarization layer 140 is disposed on the dielectric layer 120 and has an opening 142 exposing a part of the dielectric layer 120. The opening 142 is disposed at a corner 106 of the sealant region 104. A width of the opening 142 is reduced gradually as away from the corner 106 of the sealant region 104. In the present embodiment, a material of the planarization layer 140 includes an organic material such as photo-sensitive resin like polyacrylate resin, poly(epoxyacrylic) resin, photosensitive polyimide resin, polyester acrylate resin, polyurethane acrylate resin, novolac epoxy acrylic resin or a mixture material thereof, for example. In the present embodiment, the opening 142 has a main opening 142a, a first extending opening 142b, and a second extending opening 142c, for instance. The main opening 142a is disposed at the corner 106 of the sealant region 104, the first extending opening 142b extends from the main opening 142a along a first direction D1 and the second extending opening 142c extends from the main opening 142a along a second direction D2. A width w1 of the first extending opening 142b is gradually reduced as away from the main opening 142a and a width w2 of the second extending opening 142c is gradually reduced as away from the main opening 142a. In the present embodiment, the first direction D1 is substantially perpendicular to the second direction D2, for example. The first direction D1 is an x direction and the second direction D2 is a y direction, for example. In the present embodiment, the main opening 142a has a shape of a rectangle, for example, and the first extending opening 142b and the second extending opening 142c have a shape of an isosceles triangle, for instance.

The first extending opening 142b and the second extending opening 142c have a shape of an isosceles triangle in the present embodiment. Moreover, the first extending opening 142b and the second extending opening 142c have the same shape, for example. Nevertheless, in other embodiments, the first extending opening 142b and the second extending opening 142c can also have other shapes and be different shapes.

Figure 4:
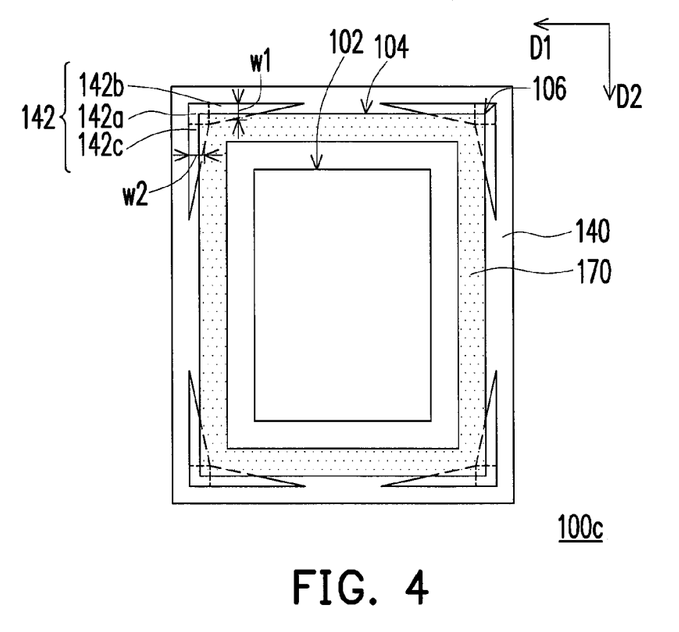
FIG. 4 is a schematic top view illustrating a display panel according to one embodiment of the invention.
Figure 5:
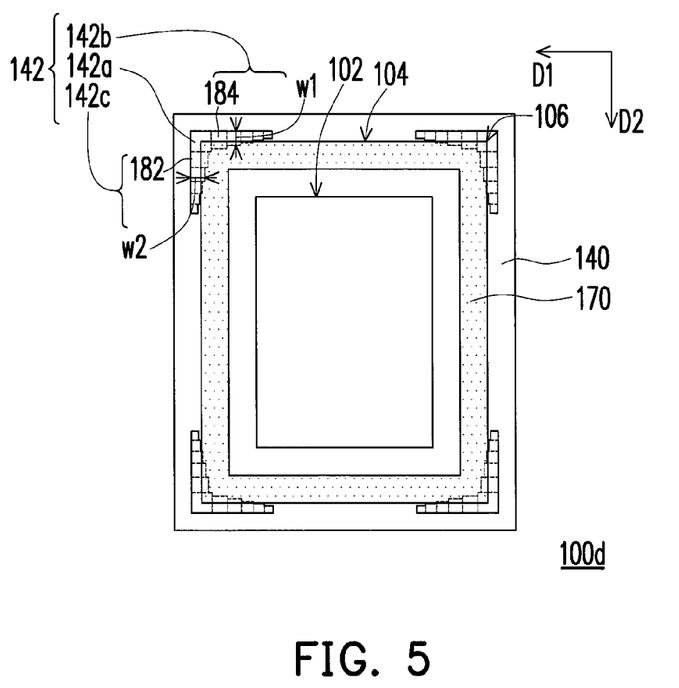
FIG. 5 is a schematic top view illustrating a display panel according to one embodiment of the invention.
Figure 6:
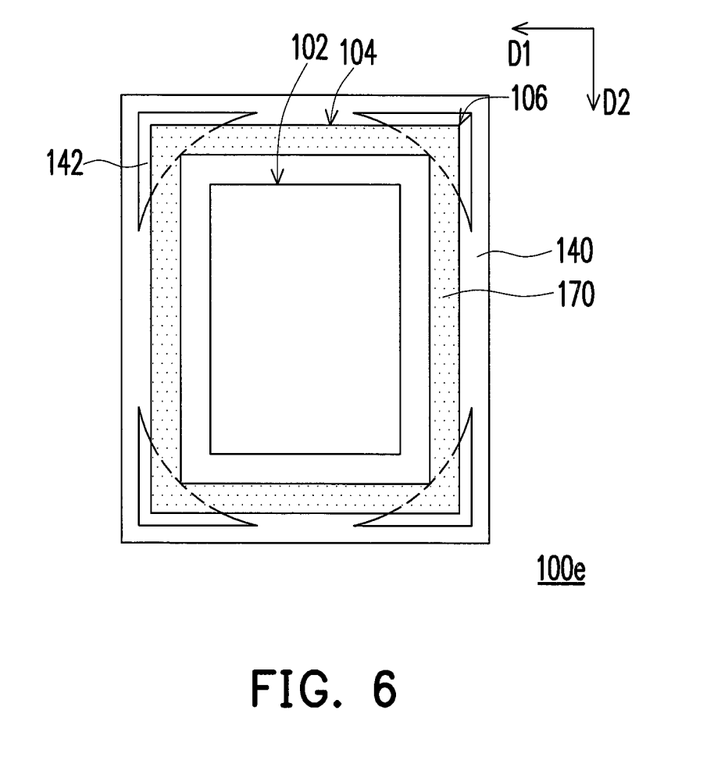
FIG. 6 is a schematic top view illustrating a display panel according to one embodiment of the invention.

For example, in one embodiment, as depicted in FIG. 4, the first extending opening 142b and the second extending opening 142c can also have a shape of a right triangle in a display panel 100c. In another embodiment as illustrated in FIG. 5, in a display panel 100d, the first extending opening 142b is substantially constituted by a plurality of first sub-openings 184. The first sub-openings 184 communicate with one another and a size w1 of each of the first sub-openings 184 is reduced as a position of each of the first sub-openings 184 is farther away from the main opening 142a. The size w1 of the first sub-openings 184 ranges from 300 μm to 1000 μm, for example. The second extending opening 142c is substantially constituted by a plurality of second sub-openings 182. The second sub-openings 182 communicate with one another and a size w2 of each of the second sub-openings 182 is reduced as a position of each of the second sub-openings 182 is farther away from the main opening 142a. The size w2 of the second sub-openings 182 ranges from 250 μm to 950 μm, for example. In the present embodiment, the first sub-openings 184 and the second sub-openings 182 have a shape of a rectangle such as a square shape, for instance. In another embodiment as shown in FIG. 6, in a display panel 100e, the opening 142 has a triangle-like shape with an arc shaped side, for example. In other words, the openings 142 can have various configurations as long as the width of the opening 142 is gradually reduced as away from the corner 106 of the sealant region 104.

Referring to FIGS. 3A and 3B simultaneously, the sealant 170 is disposed in the sealant region 104 between the first substrate 110 and the second substrate 150. The sealant 170 is filled in a part of the opening 142 without covering at least a sidewall 144 of the opening 142 of the planarization layer 140, and contacts the dielectric layer 120 and a part of the patterned transparent conductive layer 132 through the opening 142. In the present embodiment, the sealant 170 has a shape of a closed loop which surrounds the display region 102, for example. A material of the sealant 170 includes a thermal curing adhesive, a photosensitive adhesive, or a photosensitive thermal curing adhesive, for example. It should be illustrated that since the width of the opening 142 is reduced gradually as away from the corner 106 of the sealant region 104, the sealant 170 can be coated evenly in cooperation with a dispenser having gradually changing coating speed. Accordingly, the sealant 170 can have a predetermined width with consistency.

The opening 142 has two relative sidewalls 144 and 146, for example. Here, the sidewall 144 is farther away from the display region 102 than the sidewall 146. In other words, the sidewall 144 is an outer side and the sidewall 146 is an inner side, for example. In the present embodiment, the sealant 170, for instance, covers the planarization layer 140 on the inner sidewall 146 of the opening 142, but does not cover the planarization layer 140 on the outer sidewall 144 of the opening 142. In the present embodiment, the sealant 170 covers a part of the first patterned conductive layer 130 exposed by the opening 142, for example. In one embodiment, the part of the first patterned conductive layer 130 exposed by the opening 142 is disposed with the patterned transparent conductive layer 132 thereon. Further, in another embodiment, referring to FIG. 2B, the sealant 170 may not cover the two relative sidewalls 144, 146 of the opening 142. In other words, the sealant 170 merely fills in the opening 142, but does not cover the inner sidewall 146 and the outer sidewall 144 of the opening 142.

It should be noted that in the embodiment aforementioned, the planarization layer 140 has four openings 142 at the four corners 106 of the sealant region 104. In other embodiment, the planarization layer 140 can also have one, two, or three openings 142.

The planarization layer 140 at the corner 106 of the sealant region 104 is removed to form the opening 142 in the present embodiment, so that the sealant 170 at the corner 106 of the sealant region 104 can contact the dielectric layer 120 directly through the opening 142. Since the adhesion between the sealant 170 and the dielectric layer 120 is remarkably greater than the adhesion between the planarization layer 140 and the dielectric layer 120, the strength at the corners of the display panels 100b-100e can be improved significantly. Specifically, the size of the opening 142 in the planarization layer 140 is designed to be gradually reduced as away from the corner 106 of the sealant region 104 in the present embodiment, the sealant 170 can thus be coated evenly to achieve a consistent width. Accordingly, the fabrication of the display panels 100b-100e in the present embodiment can be integrated with the conventional display panel fabrication easily without increasing the fabrication cost greatly. Moreover, only the planarization layer 140 at the corners is removed in the present embodiment. Since fewer circuits are disposed at the corners and most of the circuits are common signals, the short circuit and the corrosion of the circuits have smaller effects on the display panel. Therefore, the display panels 100b-100e in the present embodiment have improved strength and superior device properties.

In summary, in the display panel of the invention, the planarization layer has the openings at the corners of the sealant region. The sealant can thus be filled in a part of the opening without covering at least a sidewall of the opening of the planarization layer. The sealant then contacts the dielectric layer directly through the opening. Since the adhesion between the sealant and the dielectric layer is notably greater than the adhesion between the planarization layer and the dielectric layer, the strength at the corners of the display panels can be improved significantly. Specifically, since only the planarization layer at the corners is removed in the invention, the effects of removing the planarization layer on the circuits of the display panel can be reduced to its minimum. The invention is therefore suitable for fabricating LTPS display panels and display panels with narrow frames. In addition, the fabrication of forming the openings at the corners of the planarization layer can be integrated with the fabrication of the conventional display panels easily. Accordingly, the display panel of the invention has improved strength and superior device properties and does not greatly increase the fabrication time and cost of the display panel.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A display panel, having a display region and a sealant region, and comprising:
 a first substrate;
 a dielectric layer disposed on the first substrate;
 a planarization layer disposed on the dielectric layer and having at least one opening exposing the dielectric layer, the opening being disposed at a corner of the sealant region and a width of the opening gradually reduced away from the corner of the sealant region;
 a second substrate disposed opposite to the first substrate;
 a display medium disposed in the display region between the first substrate and the second substrate; and
 a sealant disposed in the sealant region between the first substrate and the second substrate, wherein the sealant is filled in a part of the opening without covering at least a sidewall of the opening of the planarization layer and contacts the dielectric layer through the opening.

2. The display panel as claimed in claim 1, wherein the planarization layer is made of an organic material.

3. The display panel as claimed in claim 1, wherein the opening has a main opening, a first extending opening, and a second extending opening, the main opening is disposed at the corner of the sealant region, the first extending opening extends from the main opening along a first direction and the second extending opening extends from the main opening along a second direction, wherein a width of the first extending opening is gradually reduced as away from the main opening and a width of the second extending opening is gradually reduced as away from the main opening.

4. The display panel as claimed in claim 3, wherein the first direction is substantially perpendicular to the second direction.

5. The display panel as claimed in claim 3, wherein the first extending opening and the second extending opening have a same shape.

6. The display panel as claimed in claim 3, wherein the first extending opening and the second extending opening have a shape of an isosceles triangle or a right triangle.

7. The display panel as claimed in claim 3, wherein the first extending opening is substantially constituted by a plurality of first sub-openings, a size of the first sub-opening is reduced as a position of each of the first sub-openings is farther away from the main opening.

8. The display panel as claimed in claim 7, wherein a shape of each of the first sub-openings comprises a rectangular shape.

9. The display panel as claimed in claim 3, wherein the second extending opening is substantially constituted by a plurality of second sub-openings, a size of the second sub-opening is reduced as a position of each of the second sub-openings is farther away from the main opening.

10. The display panel as claimed in claim 9, wherein a shape of each of the second sub-openings comprises a rectangular shape.

11. The display panel as claimed in claim 1, further comprising a first patterned conductive layer at least partially disposed on the dielectric layer in the sealant region, wherein the opening exposes a part of the first patterned conductive layer and the sealant contacts with the part of the first patterned conductive layer through the opening.

12. The display panel as claimed in claim 11, wherein a patterned transparent conductive layer is disposed on the part of the first patterned conductive layer exposed by the opening and the sealant contacts the patterned transparent conductive layer through the opening.

13. A display panel, having a display region and a sealant region, and comprising:
 a first substrate;
 a dielectric layer disposed on the first substrate;
 a first patterned conductive layer at least partially disposed on the dielectric layer in the sealant region;
 a planarization layer disposed on the first patterned conductive layer and the dielectric layer, and having at least one opening disposed at a corner of the sealant region and exposing a part of the first patterned conductive layer and a part of the dielectric layer;
 a second substrate disposed opposite to the first substrate;

a display medium disposed in the display region between the first substrate and the second substrate;

a sealant disposed in the sealant region between the first substrate and the second substrate, wherein the sealant is filled in a part of the opening without covering at least a sidewall of the opening of the planarization layer and contacts the dielectric layer and the first patterned conductive layer through the opening; and wherein a patterned transparent conductive layer is disposed on the part of the first patterned conductive layer exposed by the opening and the sealant contacts the patterned transparent conductive layer through the opening.

14. The display panel as claimed in claim 13, wherein the planarization layer is made of an organic material.

15. The display panel as claimed in claim 13, wherein the opening has a triangle-like shape with an arc shaped side.

16. The display panel as claimed in claim 13, wherein the opening has an L shape.

17. The display panel as claimed in claim 16, wherein the opening has a consistent width.

18. The display panel as claimed in claim 13, wherein the sealant does not cover the planarization layer on two relative sidewalls of the opening.

19. The display panel as claimed in claim 13, wherein the sealant does not cover the planarization layer on an outer sidewall of the opening.

* * * * *